US006708593B1

United States Patent
Weselyk

(10) Patent No.: US 6,708,593 B1
(45) Date of Patent: Mar. 23, 2004

(54) FOLDING, STRAIGHT-LINE, WORKPIECE GUIDE FOR A BAND SAW

(76) Inventor: William Weselyk, 919 Stargazer Rd., Coatsville, PA (US) 19320

(*) Notice: Subject to any disclaimer, the term of this patent is extended or adjusted under 35 U.S.C. 154(b) by 0 days.

(21) Appl. No.: 09/345,708

(22) Filed: Jun. 30, 1999

(51) Int. Cl.$^7$ .............................. B25H 1/04; B25H 1/16; B27B 25/10
(52) U.S. Cl. ................. 83/708; 83/412; 83/435.11; 83/435.27; 83/714; 83/717; 83/720; 83/723; 83/728; 83/729; 83/730; 83/788; 144/286.1; 144/287; 414/18
(58) Field of Search ................. 83/435.11, 438, 83/707, 713, 730, 788, 412, 415, 435.27, 714–717, 719–722, 728, 729, 435.12, 437.1, 708, 723; 144/286.1, 286.5, 287; 269/901; 414/14–20

(56) References Cited

U.S. PATENT DOCUMENTS

| | | | | |
|---|---|---|---|---|
| 475,328 A | * | 5/1892 | Long | 83/788 X |
| 2,467,532 A | * | 4/1949 | Lasar | 83/788 X |
| 2,555,217 A | * | 5/1951 | Young | 144/286.1 X |
| D183,459 S | * | 9/1958 | Lasar | 83/788 X |
| 2,850,055 A | * | 9/1958 | Lasar | 83/788 X |
| 3,009,492 A | * | 11/1961 | Lasar | 83/435.11 |
| 3,092,157 A | * | 6/1963 | Lasar | 83/788 X |
| 3,508,590 A | * | 4/1970 | Sprague, Sr. | 83/788 X |
| 4,068,551 A | * | 1/1978 | Kreitz | 144/286.1 X |
| 4,341,247 A | * | 7/1982 | Price | 144/287 |
| 4,367,668 A | * | 1/1983 | Jensen | 83/435.11 X |
| 4,497,353 A | * | 2/1985 | Sproat, Jr. | 144/286.1 X |
| 4,934,423 A | * | 6/1990 | Withrow | 144/286.1 |
| 5,105,862 A | * | 4/1992 | Skinner et al. | 144/287 |
| 5,823,084 A | * | 10/1998 | Ramey | 83/435.11 X |
| 5,918,520 A | * | 7/1999 | Whitcomb | 83/435.11 X |

* cited by examiner

Primary Examiner—Clark F. Dexter
(74) Attorney, Agent, or Firm—Joseph M. Konieczny, Sr.

(57) ABSTRACT

A folding, straight-line, workpiece guide for a saw having a base, a saw blade extending vertically through the base, and a feed path relative to the saw blade. The workpiece guide comprises an elongated table which can be collapsed into a folded configuration or set up and locked into a working configuration. A carriage is constructed and arranged to support multiple elongated workpieces and to slide along the foldable table. The foldable table has multiple chassis sections pivotally connected to one another, adjustable legs, connectors for connecting the table to the base of the saw parallel to the feed path of the saw, and a guide track for guiding the carriage along the table when the table is in the working configuration. The carriage includes guides for guiding the carriage along the track at a fixed widthwise distance from the vertically-extending saw blade and clamps to releasably mount multiple work pieces on the carriage frame and to adjustably position the work pieces at a plurality of widthwise distances relative to the vertically-extending saw blade.

22 Claims, 8 Drawing Sheets

FOLDING, STRAIGHT-LINE, WORKPIECE GUIDE FOR A BAND SAW

FIELD OF THE INVENTION

The present invention relates to a folding, straight-line, work piece guide for a band saw which enables a craftsman to safely and efficiently rip, taper, bevel and reduce the thickness of multiple elongate pieces of standard hardwood stock.

BACKGROUND OF THE INVENTION

Rough-cut, hardwood stock is typically only supplied in ¼ inch nominal thickness increments called "quarters". The smallest common thickness for hardwood stock is 4 quarter or 1 inch nominal while the largest common thickness is 16 quarter or 4 inches nominal. Often, hardwood stock having a nominal thickness less than 1 inch is required for a particular woodworking component. For example, furniture drawer sides are typically ½–¾ inches in thickness while the drawer bottom is typically about ½ inch thick.

To make components having a thickness less than 1 inch, it is necessary to reduce the thickness of 1 inch thick hardwood stock. The most common thickness reduction method known in the prior art is to mill away 1 inch hard-wood stock using a jointer until the hardwood stock is reduced to the desired nominal thickness. This prior art method is extremely hazardous due to the inherent hazards of working with a jointer which is known to be the most dangerous piece of woodworking machinery in any woodworking shop. The jointer is so dangerous that jointers over about 12 inches in width have been outlawed in many apprentice workshops.

The prior art method of milling away 1 inch hardwood stock is also inefficient for several reasons. Large amounts of costly hardwood are wasted by reducing the thickness of standard hardwood stock. For example, when making ½ inch drawer sides, about ½ of the 1 inch hardwood stock is milled away and discarded. Further, the manpower and machinery (including cutters) greatly increases the overhead of the project. Therefore, it would be desirable to provide a method of reducing the thickness of standard hardwood stock in a safe and efficient manner.

The band saw is a very efficient and economical piece of woodworking machinery common to most woodworking shops. For example, the horse power requirement of a band saw is less than ½ of the horse power requirement of a circular saw. Additionally, the kerf on a typical circular saw blade is ⅛ to 3/16 inches while the kerf of the blade on a typical band saw is only 1/32 to 1/16 inches.

A band saw is also a very safe piece of machinery compared to other cutting machinery. For example the most common cause of accidental injury in the woodworking shop is "kick back" of the workpiece. While "kick back" is inherent in all machinery having a rotating cutter (blades or cutter heads), a band saw does not "kick back" the workpiece. While the band saw is recognized as a safe and economical tool, it is infrequently used by most craftsmen. Therefore, it would also be desirable to adapt the band saw to be a more versatile tool and make more effective use of the band saw in everyday woodworking operations.

Before mill-seasoned hardwood stock can be used to make furniture, cabinets, bookshelves, or other fine objects, any cup, warp, twist, or wane in the mill-seasoned stock must be removed. A craftsman must first straighten one edge surface and one face surface before subsequently ripping, cross-cutting, planing or otherwise reducing the hardwood stock to exact dimensions.

Initially, one face surface of the stock is straightened using the jointer. It is usually necessary to make multiple passes on the jointer in order to eliminate face surface defects and reduce the thickness of the board to the desired dimension. If the stock is over about 6 feet in length, a craftsman is needed at both the infeed end and outfeed end to safely handle the stock. Additionally, as described above, the jointer is extremely dangerous to even a well-experienced craftsman. Therefore, it would be desirable to provide a safe and efficient woodworking tool which efficiently and safely straightens the face surfaces of hardwood stock so that the wood jointer can be returned to its original intended use as a fine-finish cutting, glue joint, and saw mark removal machine.

After the face surfaces of the stock are straightened, the edge surfaces are straightened using a table saw. To straighten the lengthwise-extending edges, a craftsman slides the work piece along a stationary fence past the circulating blade. During ripping, long pieces of stock tend to veer off the outfeed end of the fence, thereby causing a non-parallel cut. Further, feeding each piece of hardwood stock individually is time consuming. Therefore, it would be desirable to provide a tool which simultaneously rips multiple elongate pieces of stock and prevents veering from a continuous straight path past the blade.

For most woodworking hobbyists, work space in the shop is not prevalent. Even in commercial work shops, multiple pieces of machinery crowd the shop and may create an unsafe work environment. Prior art machinery used for ripping elongate boards have permanent, elongate guide assemblies, typically 8–10 feet long, at both the infeed and outfeed of the saw. When not in use, such guides unnecessarily occupy a large amount of the available work space in the shop. Therefore, it would be desirable to provide a workpiece guide assembly which is foldable when not in use to free-up additional workspace for other woodworking operations.

SUMMARY OF THE INVENTION

The present invention provides a folding, straight-line, work piece guide for a band saw having a base, a saw blade extending vertically through the base, and a feed path relative to the saw blade. The work piece guide enables a craftsman to safely and efficiently rip, taper, bevel and reduce the thickness of multiple pieces of standard hardwood stock using the band saw. The work piece guide also provides a safe and efficient method of straightening the face and edge surfaces of hardwood stock without the use of the jointer. The work piece guide is foldable when not in use to free-up additional workspace for other woodworking operations.

The folding, straight-line, work piece guide generally comprises an elongate table which can be collapsed into a folded configuration or set up and locked into a working configuration, and a carriage constructed and arranged to support multiple, elongate work pieces and to slide on the track along the feed path of the saw.

The elongate table is made of multiple chassis sections pivotally-connected to one another which form a continuous but foldable table having a lengthwise axis. The chassis sections have a top side and a bottom side. The table has an infeed end portion and an outfeed end portion. A central base portion is constructed and arranged to be securely fastened to the base of the saw. The central portion connects the elongate table parallel to the feed path of the saw.

Each of the infeed end portion and outfeed end portion is also made of multiple hinged chassis sections which can be set up and locked into a working configuration or can be folded into a generally-flat configuration. One end of both the infeed and outfeed end portion is pivotally connected to the central base portion. The end portions suspend from the central base portion when the end portions are folded and locked into a flat configuration.

Adjustable legs support the table. The legs comprise a pair of telescoping leg members which can be rough adjusted and locked in a plurality of heightwise positions. One of the leg members is hinged to a chassis section, and the other leg member has an adjustable foot which can be finely adjusted and locked in a plurality of heightwise positions. The legs are foldable coplanar with the chassis section to which the leg is attached.

A guide track section is mounted on the top side of each chassis section. The guide track sections form a continuous guide track for guiding the carriage along the table when the table is in the working configuration. The guide tracks are adjustable slightly skew to the lengthwise axis of the elongate table so that the guide track is parallel to the "lead" of the saw blade.

At least two adjacent chassis sections are pivotally connected to one another by a top side elevator hinge. Each of the guide track sections are linearly aligned when the table is set up in the working configuration, and at least one of the guide track segments becomes linearly offset from an adjacent guide track section when the table is collapsed into the folded configuration.

Each of the chassis segments also includes a flat track segment opposed to the guide track segments. The flat track segments form a continuous flat race aligned parallel to the guide track when the elongate table is set up in the working configuration.

The carriage includes a carriage frame which has means for guiding the carriage along the track at a fixed widthwise distance from the vertically-extending saw blade. A work piece support assembly is constructed and arranged to releasably mount multiple stacked work pieces on the carriage frame and to adjustably position the work pieces at a plurality of widthwise distances relative to the vertically-extending saw blade. The work piece support assembly includes means for releasably mounting the work pieces on the carriage; means for adjusting the widthwise distance of the work pieces from the vertically-extending saw blade; and, means for aligning the lengthwise-extending edges of the work pieces parallel to the feed path of the saw.

The work piece support assembly may also includes means for changing the angular orientation of the work piece relative to the saw blade. The support assembly preferably includes means for changing the roll angle or the yaw angle of the work pieces for cutting beveled edges on the work piece or making tapered cuts.

In one embodiment, the work piece support assembly includes a plurality of linearly-aligned block towers and an elongate fence fixed to and extending intermediate the towers. The block towers have a horizontally-extending base member, a vertically-extending support member pivotally connected to the base member, and an adjustable arm supporting the support member at a range of angles relative to the base member.

Each of the support members has a gripping dog assembly adjustably mounted on the support member. Each of the base members including a guide slot which cooperates with a guide pin on the carriage frame. The guide pins and dogs having quick-release fasteners.

The adjustment means and the alignment means preferably comprises a pair of parallel rack and pinion assemblies. The pinions are mounted on a common axle supported by the assembly. The racks are formed in the carriage frame and are calibrated to be at the same widthwise distance. Preferably a socket is formed in the axle end so that the axle can be adjusted/rotated using a socket wrench.

DETAILED DESCRIPTION OF PREFERRED EMBODIMENTS

Figure 1:
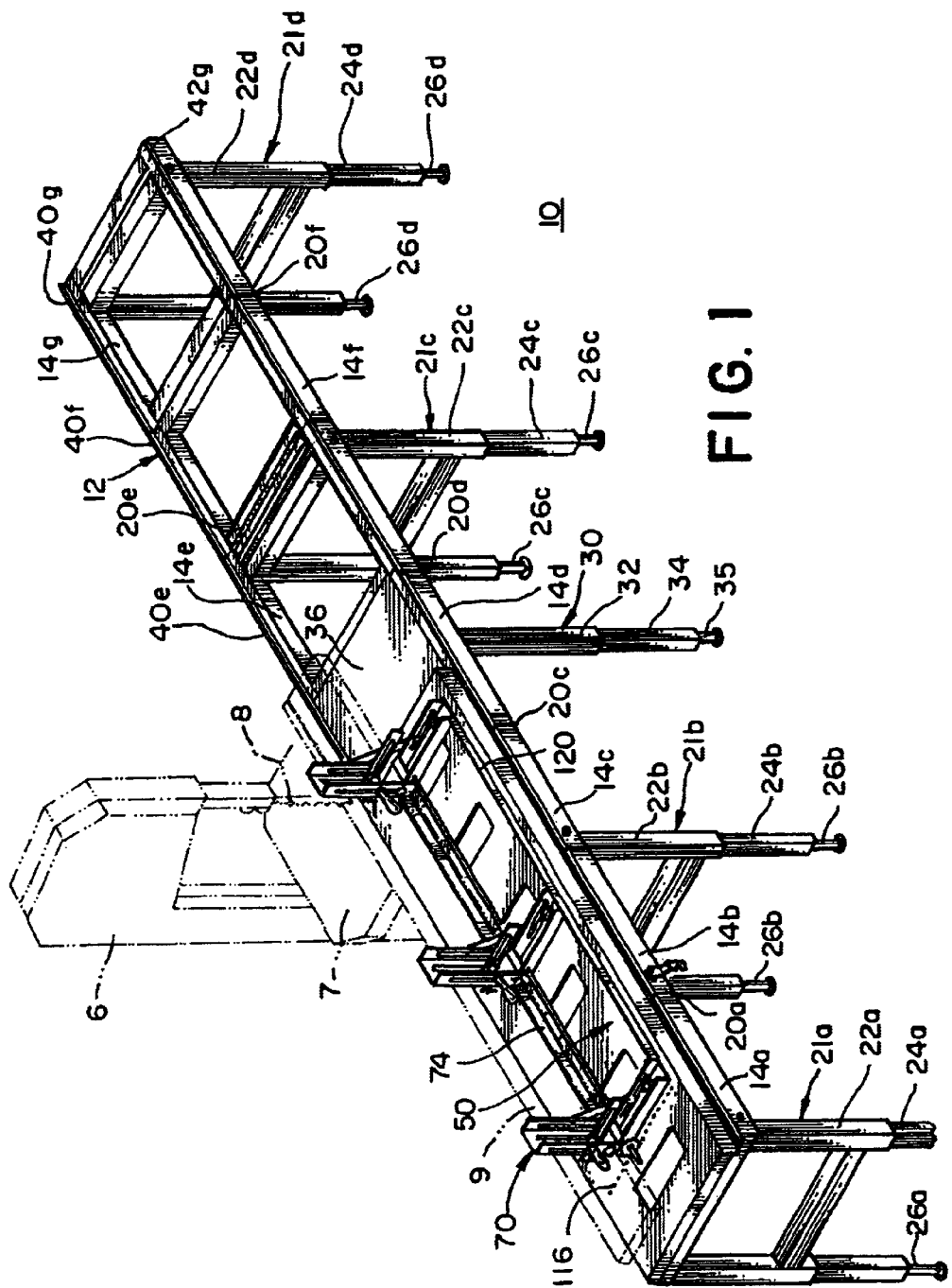
FIG. 1 is a perspective view of a straight-line, workpiece guide in accordance with an embodiment of the invention attached to a band saw (shown in phantom)

The straight-line, work piece guide of the present invention is described below with reference to FIGS. 1–10 wherein like reference numerals are used throughout to designate like elements. The work piece guide assembly, designated generally by reference numeral 10, is designed for ripping, tapering, and bevelling both the edge and face surface of elongate rough cut lumber. The workpiece guide assembly 10 has particular application to, and is described below with reference to, a conventional band saw. However, one of ordinary skill in the art should readily appreciate that the workpiece guide assembly 10 may be adopted for use with other machinery.

Shown in phantom in FIG. 1, the band saw 6 has a flat table base 7 and a continuous-loop saw blade 8 extending vertically upwardly through the base. The workpieces guide assembly 10 illustrated in FIGS. 1–10 is preferably used with a band saw having at least about 2 horse power and at least about an 18 inch throat.

Figure 8:
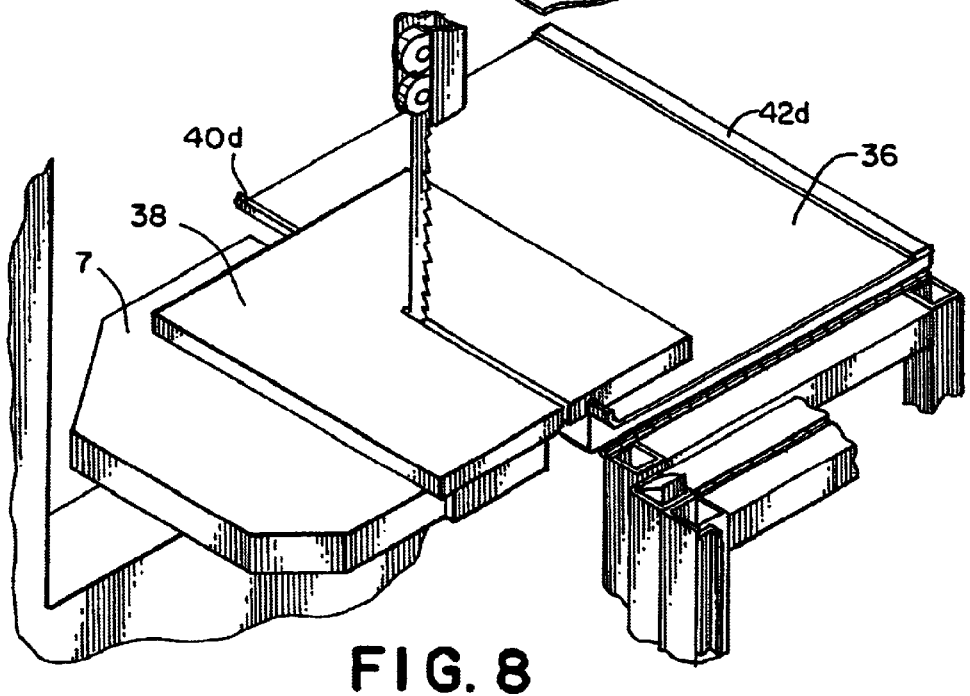
FIG. 8 is a perspective view of an adapter plate for use on the band saw when the table is folded into a generally-flat configuration.

The workpiece guide assembly 10 generally comprises an elongate, foldable table, designated generally by reference numeral 12, and a carriage, designated generally by reference numeral 50. The carriage 50 is constructed and arranged to support either a single or multiple, elongate workpieces 9 (shown in phantom in FIGS. 1 and 3) and to slide along the table 12 while ripping, beveling, or tapering the workpiece(s). The elongate table can be collapsed into a folded configuration, such as seen in FIGS. 7 and 8, or can be set up and locked into a working configuration such as shown in FIGS. 1–4.

The elongate table 12 is made of multiple chassis sections 14a–g which are pivotally-connected to one another by hinges 20. In a preferred embodiment the chassis sections 14 are made from box tubing welded into rectangular shapes. The strength of the tubing should be sufficient to support the carriage 50, described below, and a work load of at least 500 pounds. The length and number of chassis sections 14 is dependent on the desired overall table length.

Figure 5A:
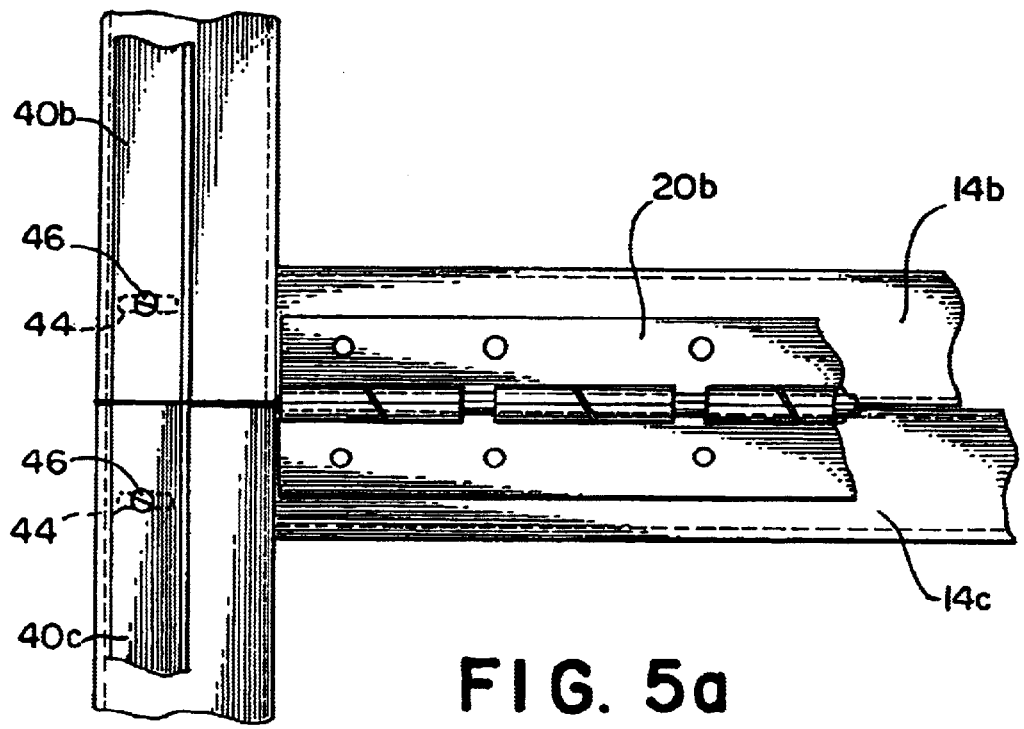
FIG. 5a is a fragmentary, enlarged top plan view of two chassis sections connected by an elevator hinge in the working configuration.
Figure 5B:
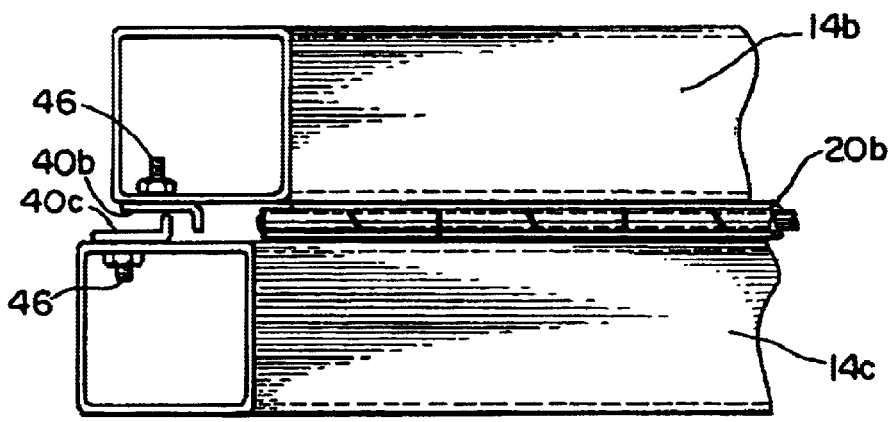
FIG. 5b is a fragmentary, front elevational view of two chassis sections connected by an elevator hinge in a folded configuration.
Figure 6:
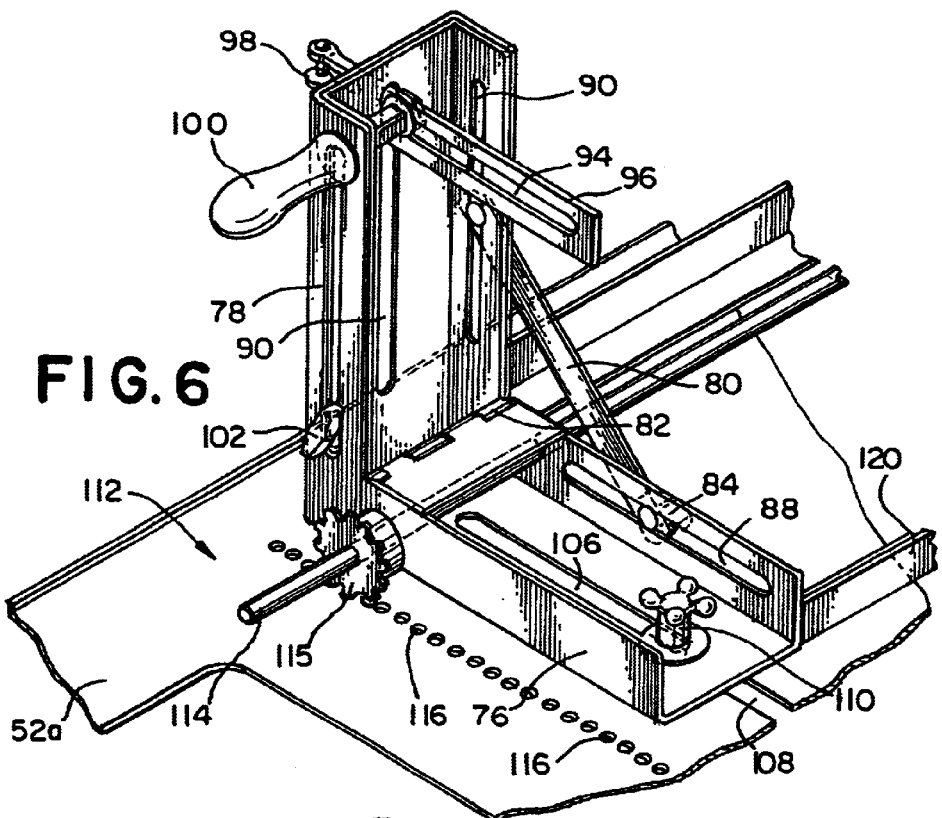
FIG. 6 is an enlarged, fragmentary perspective view of a portion of the carriage frame having a block tower.
Figure 7:
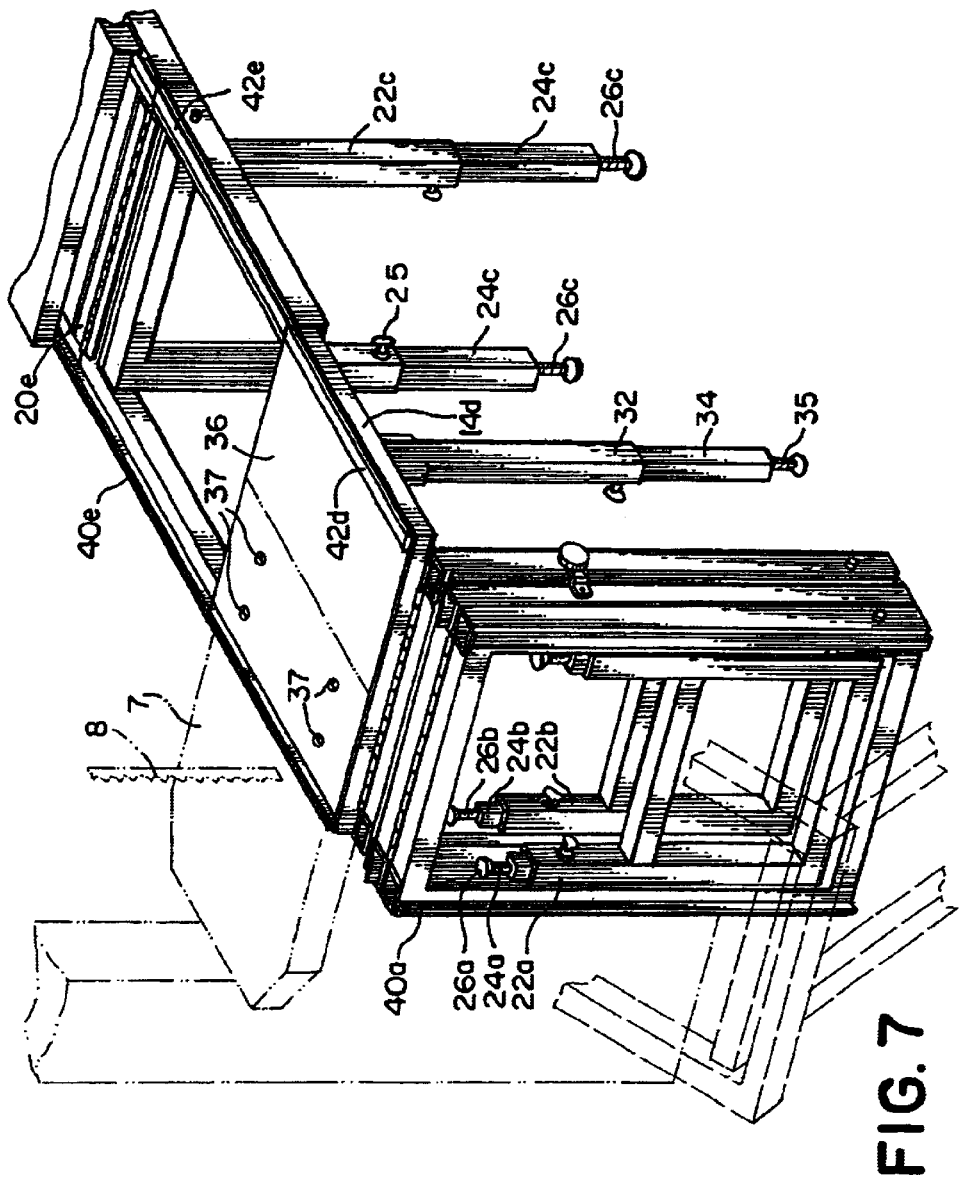
FIG. 7 is an enlarged, fragmentary perspective view of the workpiece guide of FIG. 1 showing the infeed portion of the table in a folded, generally flat configuration.
Figure 9:
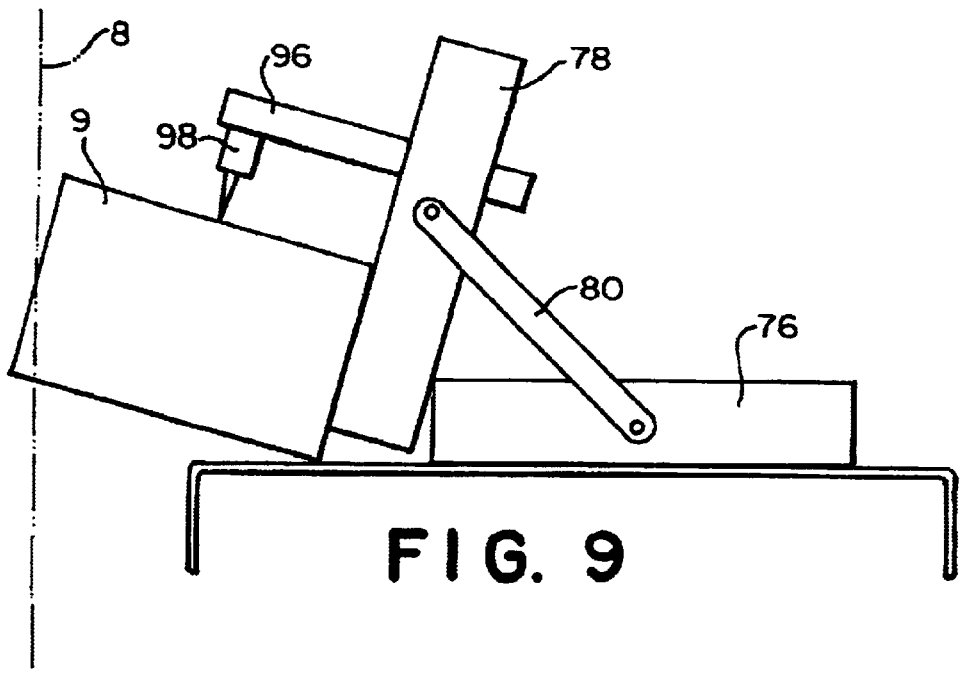
FIG. 9 is a schematic illustration of the workpiece support assembly of the carriage shown in position for bevelling the edge of a workpiece; and, FIG. 10 is a schematic illustration of the workpiece support assembly of the carriage arranged skew to the carriage for taper cutting workpieces.

In the embodiment illustrated in FIGS. 1–10, the table 12 has 3 chassis sections 14a–c at the infeed end 12a, a single, intermediate chassis section 14d at the central base portion 12b which is fixed to the base of the saw, and 3 chassis sections 14e–g at the outfeed end 12c of the table 12. For ease of manufacture, the infeed and outfeed end chassis sections 14a–c and 14e–g may be the same size, while the middle chassis section 14d is approximately the same width as the base 7 of the band saw 6. Preferably, the length of each of the end chassis sections 14a–c and 14e–g is less than the height of the base 7 of the saw 6 so that the chassis sections freely suspend from the saw base 7 when collapsed into a folded configuration such as shown in FIG. 7. In the embodiment illustrated in FIGS. 1–10, the chassis sections are approximately 33 inches long, 16 inches wide, and are made from 1½×1½ inch metal box tubing. Since the height of the base 7 of most prior art band saws is 33–36 inches, the end chassis sections 14a–c and 14e–g can be collapsed into a folded configuration and suspended from the saw base 7 without contacting the floor as shown in FIG. 7.

Figure 2:
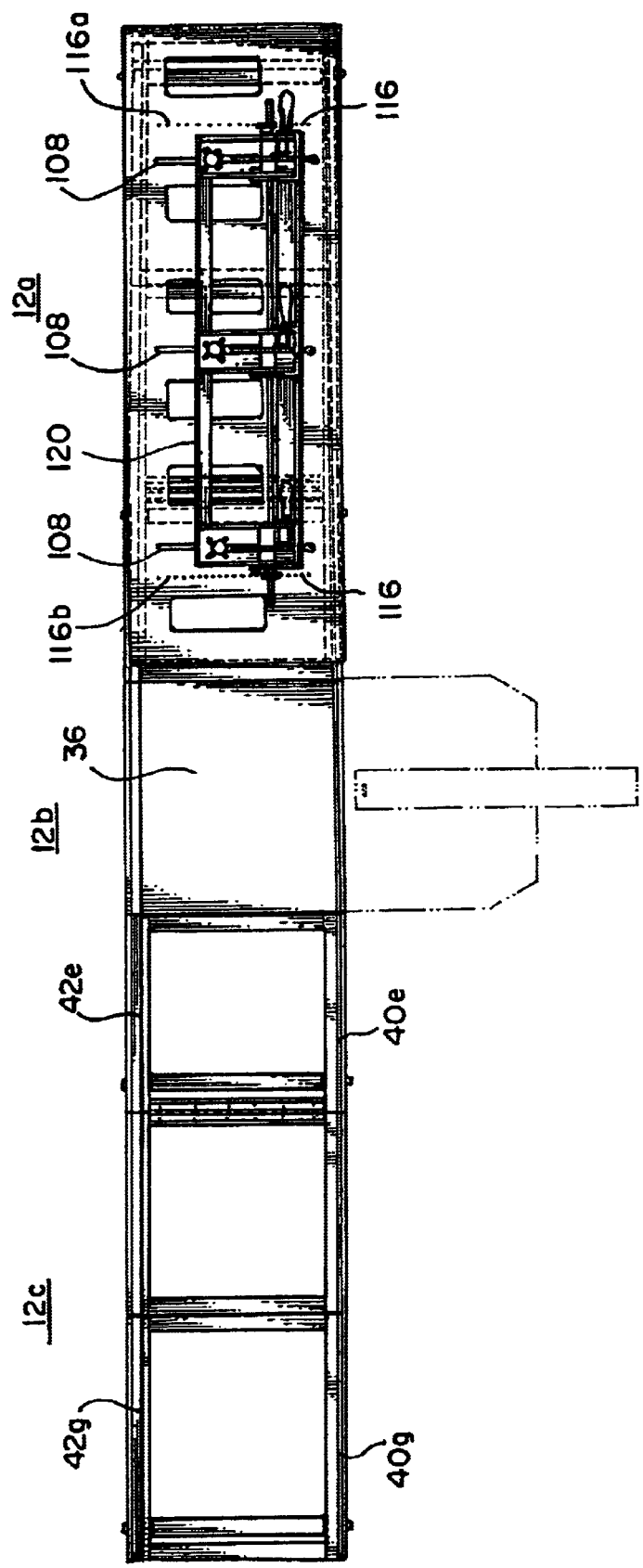
FIG. 2 is a top plan view of the workpiece guide of FIG. 1.
Figure 3:
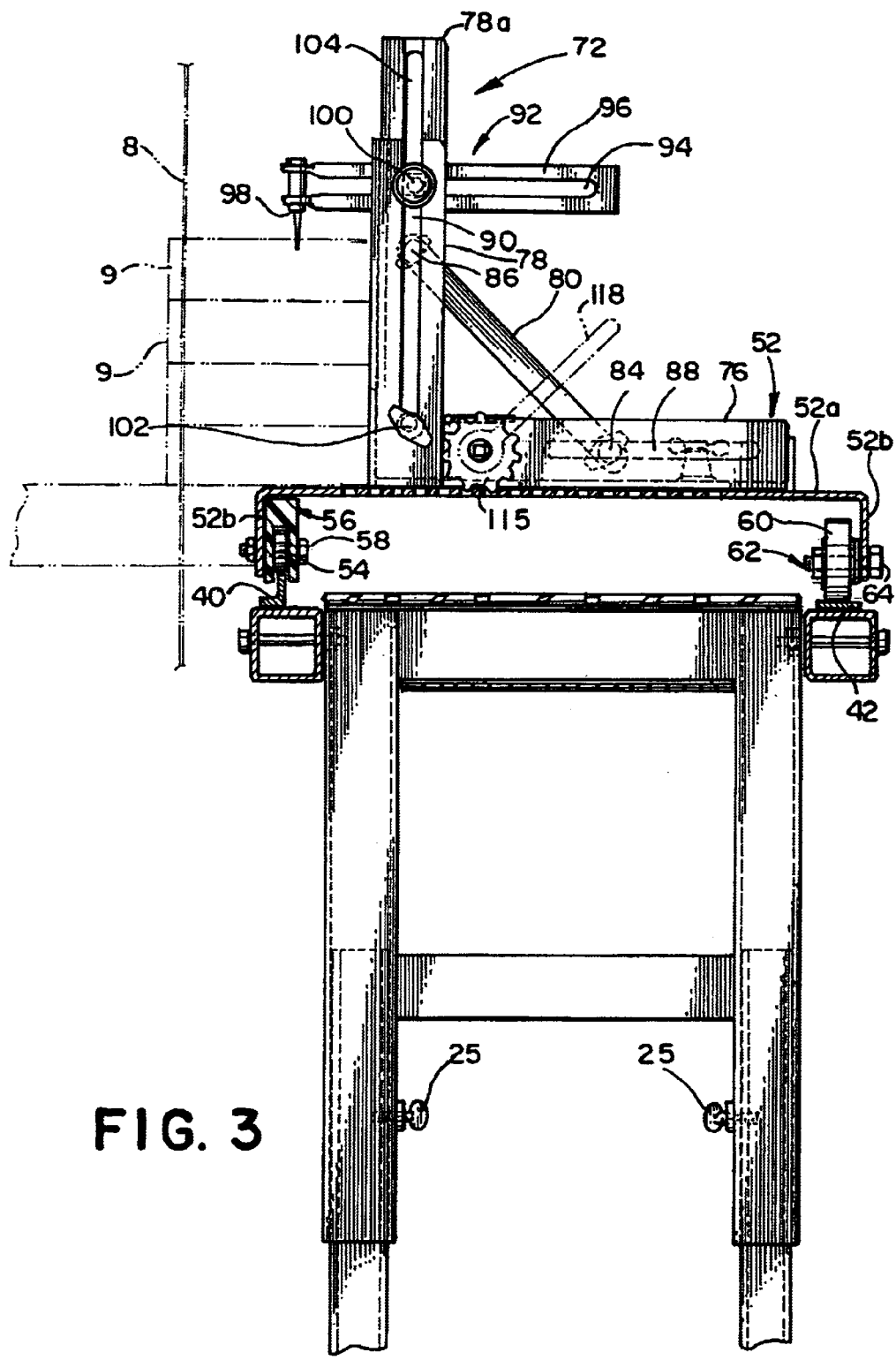
FIG. 3 is a side elevational view of the workpiece guide of FIG. 1.
Figure 4:
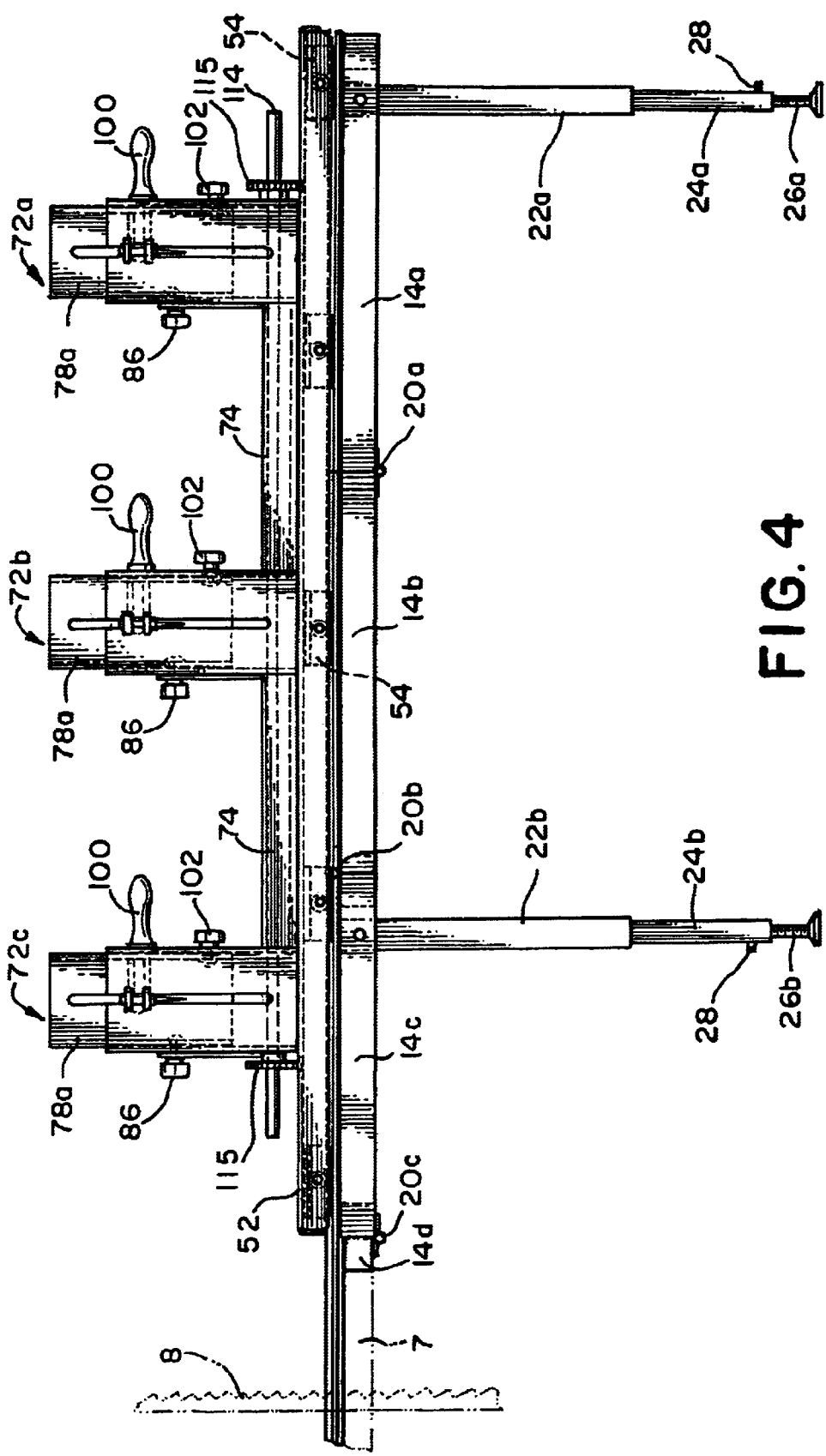
FIG. 4 is a partial, front elevational view of the workpiece guide of FIG. 1.

The table 12 has a plurality of foldable and adjustable leg assemblies 21a–d. Referring to FIGS. 1 and 7, each leg assembly 21a–d has a rectangular base frame 22a–d pivotly connected to the inside of a chassis section 14. Each base frame 22a–d has two horizontally-extending members and two vertically-extending members. The base frame members are also preferably made of 1½×1½ inch metal box tubing. Each base frame 22a–d has a pair of adjustable legs 24a–d which telescope within the vertically extending members of the base frame 22a–d for roughly adjusting the leg in a plurality of heightwise positions. Each leg 24a–d has an adjustable foot 26a–d which screws into and out of the bottom of each leg 24a–d for finely adjusting the leg 24a–d in a plurality of heightwise positions. Referring to FIG. 4, a set screw 28 extends through the bottom of each leg 24a–d and contacts the adjustable foot 26a–d to lock the adjustable foot in a desired position. Referring to FIG. 3, quick-connect/disconnect pins 25 extend through the vertically-extending members of the base frame 22a–d into one of a series of aligned apertures in the adjustable legs 24a–d to lock the telescoping legs 24a–d in a desired heigthwise position. In the embodiment illustrated in FIGS. 1–10, the total height of the legs may be adjusted from 30 to 40 inches so that the table 12 will align with the majority of prior art band saws which are typically 33 to 36 inches in height at the base.

The table 12 also preferably includes a single adjustable leg 30 mounted underneath the center chassis section 14d which supports the outer portion of the center chassis 14d. The single leg 30 has a vertically-extending base member 32, an adjustable leg 34 which telescopes within the base member 32, and an adjustable foot 35.

In one embodiment, the central chassis 14d comprises a three-sided frame made of metal box tubing and a solid plate 36 secured to the top side of the frame. The solid plate 36 is bolted or otherwise firmly secured to the base 7 of the saw 6 by a plurality of bolts 37 (FIG. 7). The solid plate 36 anchors the table 12 to the base 7 of the band saw 6 so that the table 12 remains in alignment with the saw during cutting and each time the table 12 is folded and set up. Referring to FIG. 8, the solid plate 36 also supports one side of an adapter plate 38 which is installed when the table is collapsed into a folded configuration so that the band saw can be used in its original configuration.

Each chassis section 14 include a pair of opposed track sections 40,42 mounted on the top side. A guide track section 40a–g is adjustably mounted on the inboard, lengthwise-extending section of each chassis section and a flat track section 42a–g is mounted on the outboard, lengthwise-extending section of each chassis section. The guide track 40 may be either an "L" or "T" shape track. When the table 12 is set up and locked into the working configuration shown in FIGS. 1–4, the track sections 40a–g and 42a–g form a pair of continuous parallel tracks for guiding the carriage 50 along the table 12.

As described above, the elongate table 12 is designed to be collapsed into a folded configuration such as seen in FIG. 7. While not shown therein, the outfeed end 12c of the table 12 is also collapsible into a folded configuration similar to the infeed end 12a.

Referring to FIG. 4, the hinges 20 connecting the multiple chassis sections 14 are alternately located on the upper and lower sides of the chassis sections 14 so that the table can be folded into the configuration shown in FIG. 7. In other words, the hinges 20 are alternately located so that the first chassis section 14a rotates clockwise about the second chassis section 14b; the second chassis section 14b rotates counterclockwise about the third chassis section 14c; and the third chassis section 14c rotates clockwise about the central chassis section 14d.

The hinges 20a,20c,20d,20f mounted on the bottom side of the chassis sections are preferably conventional, two-leaf hinges extending widthwise along the chassis sections 14. However, the hinges 20b,20e located on the top side of the chassis sections are preferably elevator hinges such as shown in greater detail in FIGS. 5a and 5b.

Referring to FIG. 5a, when the table 12 is set up and locked in the working configuration, the guide track sections 40b,40c align to form a continuous guide track for guiding the carriage. When the top side of the adjacent chassis sections 14b, 14c are folded onto one another, the elevator hinge 20b shifts the adjacent chassis sections 14b, 14c widthwise relative to one another so that the upwardly-protruding portions of the "L" shape guide track do not interfere with one another as best seen in FIG. 5b. Elevator hinges are not required between the first chassis section 14a and second chassis section 14b, between the third chassis section 14c and fourth chassis section 14d, between the fourth chassis section 14d and fifth chassis section 14e, or between the sixth chassis section 14f and the seventh chassis section 14g since these chassis sections fold bottom surface-to-bottom surface, both of which are flat.

Every band saw has curvature in the guide pulleys which define the "lead" of the blade. Typically, the "lead" of the blade is not perfectly parallel to the travel path of the saw and, in this case, the lengthwise axis of the table 12.

Therefore, the guide track sections 40a–g are widthwise slightly adjustable on the chassis so that the guide tracks 40a–g can be aligned perfectly parallel to the "lead" of the saw blade. To adjust the parallel alignment of the guide track sections 40a–g, elongate mounting holes 44 are provided in the lengthwise extending members of the chassis sections 14a–g which receive countersunk fasteners 46 extending through the track sections 40. If the fasteners 46 are loosened, the guide track sections 40a–g have a small amount of widthwise travel for aligning the guide track. Once the guide track is aligned parallel with the lead of saw blade, the fasteners 46 are tightened to secure the guide track 46 in place.

The carriage 50 is constructed and arranged to support either a single or multiple, elongate workpieces and to slide back and forth on the table 12 along the feed path of the saw 6. The carriage 50 has a base frame 52, preferably formed from a continuous, thin metal sheet. Referring to FIG. 3, the base frame 52 has a flat, rectangular-shaped top 52a. The opposed, lengthwise-extending edges of the frame are bent downwardly at an angle of about 90° to form flanges 52b on which rollers are mounted. The inboard guide rollers 54 have a configuration which compliments the shape of the inboard guide track 40 and prevent the carriage from rolling off the guide track 40. In the embodiment illustrated in FIG. 3, the inboard guide rollers 54 comprise "T" slotted ball-bearing wheel assemblies 56 spaced along and mounted to the inboard flange 52b of the carriage frame 52. Preferably the wheel assemblies 56 are removably fixed to the flange by bolts 58 so that the wheel assemblies 56 can be serviced or replaced as needed.

The outboard support rollers 60 preferably comprise flat-face, ball-bearing wheel assemblies spaced along and mounted to the outboard flange 52b of the carriage frame 52. The wheel assemblies 62 are also preferably removably fixed to the outboard flange 52b by bolts 64 so that the wheel assemblies 62 can be serviced or replaced as needed. The outboard support rollers 60 support the carriage frame 50 and ride along the flat track 42.

The inboard guide rollers 54 insure that the carriage 50 does not veer off the table 12. Once the elongate table 12 is initially set up and properly aligned with the "lead" of the blade, the guide rollers 54 also insure that carriage 50 slides along the table 12 at a fixed, widthwise distance from the blade 8.

A workpiece support assembly, designated generally by reference numeral 70, is adjustably mounted on the flat top portion 52a of the base frame 52. The workpiece support assembly 70 is constructed and arranged to releasably mount either a single or multiple, stacked workpieces 9 on the carriage 50 and to adjustably position the workpiece(s) 9 at a plurality of widthwise distances and angular orientations relative to the vertically-extending saw blade 8.

The workpiece support assembly 70 has means for releasably mounting the workpiece 9 on the carriage; means for adjusting the widthwise distance of the workpiece from the vertically-extending saw blade 8; and, means for aligning the lengthwise-extending edges of the workpiece 9 parallel to the feed path of the saw 8. The workpiece support assembly 70 may also include means for changing the angular orientation of the workpiece(s) relative to the saw blade 8 for tapering or bevelling the workpiece(s).

In the embodiment illustrated in FIGS. 1–10, the workpiece support assembly 70 has three linearly-aligned block towers 72 and an elongate fence 74 fixed to an extending intermediate the block towers 72. The block towers 72 have a horizontally-extending base member 76, a vertically-extending support member 78, and an adjustment arm 80 which releasably locks the vertical support member 78 at a range of angles relative to the horizontal base member 76.

The vertical support member 78 is pivotably connected to the horizontal base member 76 by a hinge 82 which is best seen in FIG. 6. The adjustment arm 80 is connected to the horizontal base member 76 by a first quick-release fastener 84 and is connected to the vertical support member 78 at the other end by a second quick-release fastener 86. In the embodiment illustrated in FIGS. 1–10, the first and second quick-release fasteners 84,86 comprise thumb screws which slide in lengthwise-extending slots 88,90 in the horizontal base member 76 and vertical support member 78, respectively. The vertical support member 78 can be releasably locked at a range of acute angles relative to the horizontal base member 76 by loosening the quick-release fasteners 84,86, tilting the vertical support member about the hinge 82, and then tightening the quick-release fasteners 84,86.

The workpiece support assembly 70 has a gripping dog 92 adjustable mounted on the vertical support member 78. The dog 92 has a support arm 96 releasably secured to the vertical support member 78 by a quick-release fastener 100, and a tooth 98 fixed to the inboard end of the arm 96. The arm 96 has a lengthwise-extending adjustment slot 94.

Referring to FIGS. 3 and 6, the height of the dog 92 is adjustable by sliding the dog 92 upwardly or downwardly within the lengthwise-extending slot 90 in the vertical support member 78. The gripping dog 92 is horizontally or widthwise adjustable by loosening the quick-release fastener 100, sliding the dog arm 96 widthwise or laterally, and then tightening the quick-release fastener 100 in the desired location with the dog tooth 98 impinging on the upper most workpiece 9.

To extend the vertical travel of the dog assembly 92, a telescoping extension member 78a may be provided on the vertical support member 78. The extension member 78a has a lengthwise-extending slot 104 which is aligned with the slot 90 in the vertical support member 78. A quick-release fastener 102 such as a thumb screw extends through the aligned slots 90,104 in the vertical support member 78 and extension member 78a, respectively.

The horizontal base member 76 has a second lengthwise-extending slot 106. Referring to FIG. 6, the base frame 52 of the carriage has a widthwise-extending guide slot 108 aligned with the second slot 106 in the horizontal base member 76. A quick-release guide/lock pin 110 extends through the aligned slots 104,108. Each block tower 72 travels within its own guide slot 108 on the carriage 50. In the embodiment illustrated in FIGS. 1–10, the quick-release guide pin 110 comprises a thumb screw. The widthwise position of the support assembly 70 on the carriage 50 can be adjusted by releasing the guide/lock pins 110, sliding the support assembly on the carriage frame, and then tightening the guide/lock pins 110 to lock the workpiece support assembly 70 in a desired position.

To insure that the support assembly 70 remains in parallel alignment with the feed path of the saw, a rack and pinion assembly, designated generally by reference numeral 112, positions the support assembly relative to the base frame 52. Referring to FIGS. 2–4 and 6, an axle 114 extends through each horizontal base member 76 lengthwise along the entire length of the support assembly. A pinion 115 is fixed to each end of the axle 114. The pinions 115 register with a series of linearly-aligned, equally-spaced apertures 116 in the flat top portion 52a of the base frame 52. The opposed series of apertures 116a,116b are parallel to one another and correspond one-to-one with each other in the widthwise direction of the base frame 52. Referring to FIG. 3, a ratchet 118 may be inserted into a socket in one end of the axle 114 and rotated to adjust the widthwise position of the support assembly 70 in fine increments.

The elongate fence 74 is fixed to the vertical support member 78 of the first 72a and third 72c block towers. In the embodiments illustrated in FIGS. 1–10, the fence 74 comprises a metal "L" channel. A second "L" channel 120 connects the outboard end of the horizontal base member 76 of the first 72a and third 72c block tower. The elongate fence 74 and second "L" channel 120 add rigidity to the support assembly 70 so that the support assembly remains square.

Each of the block towers 72 has the same construction except that the middle block tower 72b is not fixed to the elongate fence 74 or the outboard "L" channel 120. Rather, the second block tower is adjustable along the length of the carriage 50 to accommodate elongate workpieces of various lengths.

As described above, the work piece guide 10 is designed for attachment to and use with prior art band saws which may be found in a workshop. The work piece guide 10 must be initially installed onto and aligned with the band saw by bolting the solid plate 36 of the center chassis 14d squarely on the base 7 of the band saw. The table should then be set up in the working configuration as seen in FIGS. 1 and 2 and leveled by adjusting the leg assemblies 21.

After the table is set up and leveled, the alignment of the guide track sections 40a–g should be adjusted so that the travel path of the carriage 50 on the guide track 40 is parallel to the "lead" of the band saw blade. Alignment of the guide tracks 40a–g with the "lead" of the saw blade is accomplished by adjusting the guide track sections 40 slightly skew to the lengthwise axis of the table.

To edge rip work pieces 9, a single work piece, such as seen in FIG. 1, or a plurality of work pieces, such as seen in FIG. 3, are stacked on the carriage 50 and aligned by abutting one edge against the elongate fence 74 and block towers 72. The work pieces are releasably mounted on the carriage by tightening the gripping dog assemblies 92 onto the top work piece. The carriage 50 is adjusted widthwise until the inner edge of the workpieces is trimmed or straightened by conveying the workpiece through the band saw blade. Once the initial inner edge is straightened, the work pieces may then be simultaneously ripped to the desired width. The work piece(s) is safely conveyed by the carriage at a fixed widthwise distance past the band saw blade 8.

To straighten the face surfaces of a workpiece, or reduce the thickness of the workpiece, the workpiece is mounted on the carriage 50 resting on its lengthwise extending edge, i.e., rotated 90 degrees from the orientation shown in FIG. 3. The workpiece can then be cut into multiple thin veneers or bifurcated, trifurcated, etc. into reduced thickness work pieces.

To bevel the elongate edge surfaces of a workpiece, the vertically-extending support member 78 of the block towers 72 is tilted to the desired angle of the bevel. The work piece(s) is then mounted on the carriage 50 with either face surface or an elongate edge abutting the fence 74 and/or support member 78 of the tower 72 such as illustrated schematically in FIG. 9. The work piece(s) is then safely beveled as the carriage conveys the workpiece at a fixed widthwise distance past the band saw blade 8.

Figure 10:
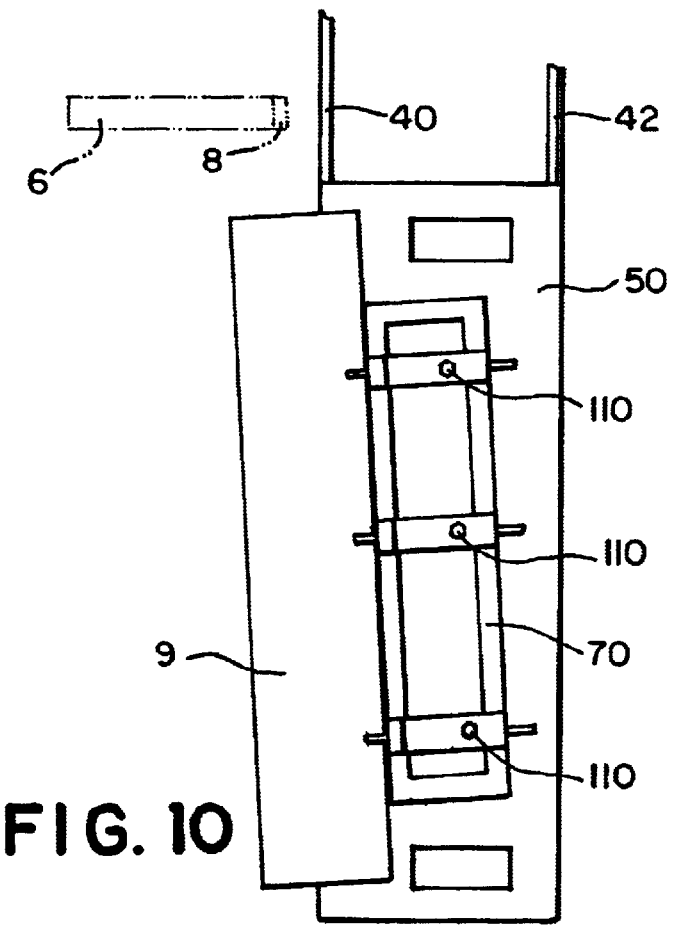

To taper cut the elongate workpiece(s), the work piece support assembly must be adjusted skew to the length of the carriage by loosening the quick release guide/lock pins 110, removing the pinions 115 from the apertures 116, and then locking the support assembly at the desired taper angle such as illustrated schematically in FIG. 10. The work piece(s) is can then be safely taper cut by conveying the work piece(s) on the carriage 50 past the band saw blade 8.

What is claimed is:

1. A folding, straight-line, work piece guide for a saw having a base, a saw blade extending vertically through the base, and a feed path relative to the saw blade, comprising:
    a) an elongate table which can be collapsed into a folded configuration or set up and locked into a working configuration, the table having:
        i) multiple chassis sections pivotally-connected to one another which form a continuous but foldable table having a lengthwise axis, the chassis sections having a top side and a bottom side;
        ii) adjustable legs supporting said table;
        iii) means for connecting said table to the base of the saw;
        iv) a guide track section on the top side of each chassis section, said guide track sections forming a continuous guide track for guiding a carriage along said table when said table is in the working configuration;
    b) a carriage for supporting multiple, elongate work pieces, said carriage being slidably supported on said track for movement along the feed path of the saw, said carriage including:
        i) a carriage frame including means for guiding said carriage along said track at a fixed widthwise distance from the vertically-extending saw blade;
        ii) a work piece support assembly having means to releasably mount multiple stacked work pieces on said carriage frame and means to adjustably position said work pieces at a plurality of widthwise distances relative to said vertically-extending saw blade.

2. The guide recited in claim 1, said table having an infeed end portion, an outfeed end portion, and a central base portion, said connecting means being located in said central portion.

3. The guide recited in claim 2, each of said infeed end portion and outfeed end portion comprising a plurality of said chassis sections which can be set up and locked into a working configuration or can be folded into a generally-flat configuration.

4. The guide recited in claim 3, wherein one end of both said infeed end portion and outfeed end portion is pivotally connected to said central base portion, said end portions suspending from said central base portion when said end portions are folded in a flat configuration.

5. The guide recited in claim 3, said legs comprising a pair of telescoping leg members which can be rough adjusted and locked in a plurality of heightwise positions.

6. The guide recited in claim 5, one of said leg members being hinged to one of said chassis sections, and the other leg member having an adjustable foot which can be finely adjusted and locked in a plurality of heightwise positions.

7. The guide recited in claim 6, said legs being foldable coplanar with the chassis section to which the leg is attached.

8. The guide recited in claim 1, said guide track sections being adjustable skew to the lengthwise axis of said elongate table.

9. The guide recited in claim 1, at least two of said adjacent chassis sections being pivotally connected to one another by a top side elevator hinge.

10. The guide recited in claim 9, each of said guide track sections being linearly aligned when said table is set up in the working configuration, and at least one of said guide track sections being linearly offset from an adjacent guide track section when said table is collapsed into the folded configuration.

11. The guide recited in claim 10, each of said chassis sections including a flat track section opposed to each of said guide track sections, said flat track sections forming a continuous race aligned parallel to said guide track when said elongate table is set up in the working configuration.

12. The guide recited in claim 1, said work piece support assembly including means for aligning the lengthwise-extending edges of the work pieces parallel to the feed path of the saw.

13. The guide recited in claim 12, said work piece support assembly further including means for changing the angular orientation of the work piece relative to the saw blade.

14. The guide recited in claim 13, including means for changing the roll angle of the work pieces for cutting beveled edges on the work piece.

15. The guide recited in claim 13, including means for changing the yaw angle of the work pieces for cutting tapered work pieces.

16. The guide recited in claim 12, said work piece support assembly further including a plurality of linearly-aligned block towers and an elongate fence fixed to and extending intermediate said towers.

17. The guide recited in claim 16, said block towers having a horizontally-extending base member, a vertically-extending support member pivotally connected to said base member, and an adjustable arm supporting said support member at a range of angles relative to said base member.

18. The guide recited in claim 17, each of said support members having a dog adjustably mounted on said support member.

19. The guide recited in claim 17, each of said base members including a guide slot which cooperates with a guide pin on said carriage frame.

20. The guide recited in claim 19, said guide pins and dogs having quick-release fasteners.

21. The guide recited in claim 12, said means to adjustably position said work pieces comprising a pair of parallel rack and pinion assemblies, said pinions being mounted on a common axle supported by said assembly, said racks being formed in said carriage frame and calibrated to be at the same widthwise distance.

22. The guide recited in claim 21, including a ratchet and a socket formed in one of said pinions.

* * * * *